2,901,393

PESTICIDES

John M. Magner, Webster Groves, Mo., assignor to Monsanto Chemical Company, St. Louis, Mo., a corporation of Delaware No Drawing. Application September 26, 1955
Serial No. 536,734

2 Claims. (Cl. 167—30)

The present invention relates to pesticide compositions and to methods for their use. The invention particularly relates to methods for destroying aquatic organisms.

An object of the present invention is to provide novel pesticides. A further object is to provide materials which are toxic to aquatic organisms and other pests. A particular object of the invention is to provide compositions which are toxic to snails. Further objects are to provide novel useful compositions containing copper phthalate and to provide anti-fouling compositions. Other and further objects will be apparent from the following description.

It has been discovered that copper phthalate is very toxic to aquatic life. Copper phthalate is especially toxic to Mollusca, both fresh and salt water, which class includes Ostrea (oysters), Anomia, Chama, Vermetus and Nudibranchiata (sea slugs), Gastropoda (snails) and Pelecypoda (clams). The following test is useful for determining toxicity to mollusks: Filter paper is placed on the bottom of disposable containers and 2 cc. of a 1:20,000 dilution of the test material is added to the filter paper. 10 snails are placed in each dish and mortality readings are made after 1, 2, 6, 24, 48, 72 and 98 hours. On the fourth day the percent kill is determined. If the material is toxic the degree of toxicity is determined by series dilutions. Copper phthalate is 100% fatal at a concentration of 3 p.p.m. 80% of the snails are killed at a concentration of 1 p.p.m.

Copper phthalate has low true water solubility. Dispersing and wetting agents are often helpful for preparing aqueous dispersions. Amounts within the range of 0.01–10% will suffice for most purposes. Examples include hard or soft sodium and potassium soaps, alkylated aromatic sodium sulfonates as for example sodium dodecylbenzene sulfonate, amine salts of dodecylbenzene sulfonic acid as for example dibutyl ammonium dodecylbenzene sulfonate, alkali metal salts of sulfated fatty alcohols, non-ionic surface active agents as for example condensation products of alkyl phenols, tall oil or dodecyl mercaptan with ethylene oxide. Also useful either alone or in combination with other dispersing aids are neutralized condensation products of formaldehyde and sulfonated naphthalene. Admixture of the dry copper phthalate with the dispersing aid provides compositions readily utilizable for dispersion in aqueous systems. Also feasible is blending copper phthalate with other dry solids as carriers. Suitable examples comprise clay, fuller's earth, diatomaceous earth, pyrophyllite, charcoal, chalk and the like.

Copper phthalate is useful for formulating anti-fouling compositions. For application to ships' bottoms and similar surfaces exposed to sea water, a water resistant coating vehicle is a convenient carrier. Copper phthalate may be added to the ordinary paint or varnish vehicle commonly used for coating steel. Proportions in the range of 10–100 parts by weight of copper phthalate per 100 parts by weight of paint are usually adequate but the proportions can be varied depending upon the specific conditions to be met. In general copper phthalate may be used with advantage in known formulations of anti-fouling paint. A typical formulation is

|  | Parts by weight |
|---|---|
| Copper phthalate | 42.2 |
| Rosin | 21.1 |
| Hydrogenated methyl abietate | 10.6 |
| Chlorinated rubber | 1.4 |
| Diatomaceous silica | 7.1 |
| Naphtha | 17.6 |

Copper phthalate is easily prepared from readily available raw materials. A method which gives excellent results is as follows: Separate solutions of sodium phthalate and copper sulfate are prepared, the first by admixing 74 parts by weight (0.5 molecular proportion) of phthalic anhydride and 160 parts by weight (1.0 molecular proportion) of 25% sodium hydroxide in 600 parts by weight of water, and the second by mixing 124.8 parts by weight (0.5 molecular proportion) of $CuSO_4.5H_2O$ and 500 parts by weight of water. Warm solutions (70° C.) of the reactants were mixed and stirred for one hour during which time the reaction mixture was heated at 70–80° C. A gelatinous blue precipitate which formed initially gradually converted to the crystalline form. The reaction mixture was allowed to stand over night and then blue-green crystals removed by filtration, washed with water and dried at 70° C. to yield 106.2 parts by weight, 93.4% yield, of copper phthalate.

It is intended to cover all changes and modifications of the examples of the invention herein chosen for purposes of disclosure which do not constitute departures from the spirit and scope of the invention.

What is claimed is:

1. The method of destroying Mollusca which comprises contacting the organism with a toxic concentration of copper phthalate.

2. The method of destroying Mollusca which comprises contacting the organism in its environment with an aqueous dispersion of copper phthalate in the concentration range of 1–50 p.p.m.

References Cited in the file of this patent

UNITED STATES PATENTS

| 2,301,762 | Tuwiner | Nov. 10, 1942 |
| 2,434,291 | Smith | Jan. 13, 1948 |

FOREIGN PATENTS

| 508,848 | Canada | Jan. 4, 1955 |

OTHER REFERENCES

Cox: Natl. Paint Bull., April 1944, pp. 5–8 (p. 6 relied on).

Mozeley: Control of Bilharzia in So. Rhodesia, Rhodesian Printing and Publ. Corp., Salisbury, Rhodesia, 1944, pp. 223–280 (pp. 223, 224 relied on).

Chem. and Eng. News, June 11, 1956, pp. 2884–86 (p. 2884 pert.).

Frear: A Catalogue of Insect. and Fungicides, Chromica Bot. Comp., vol. II, p. 35, 1948.

Frear: Chem. of Insecticides, Fung. and Herbicides, 2nd ed., 1948, D. Van Nostrand, p. 280.